(12) United States Patent
Benayon et al.

(10) Patent No.: US 7,437,277 B2
(45) Date of Patent: Oct. 14, 2008

(54) MODEL INDEPENDENT SIMULATION

(75) Inventors: Jay W. Benayon, Thornhill (CA); Pablo Daniel Irassar, Markham (CA); Bala Ramachandran, Harrison, NY (US); Vincent F. Szaloky, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 11/161,651

(22) Filed: Aug. 11, 2005

(65) Prior Publication Data
US 2007/0038416 A1 Feb. 15, 2007

(51) Int. Cl.
G06F 7/60 (2006.01)
G06F 7/48 (2006.01)
G06F 7/00 (2006.01)
G06F 17/00 (2006.01)

(52) U.S. Cl. .................. 703/2; 703/6; 707/1; 707/101; 707/102; 707/103 R

(58) Field of Classification Search .................. 703/2, 703/6; 707/1, 101, 102, 103, 103 R
See application file for complete search history.

(56) References Cited

U.S. PATENT DOCUMENTS 5,392,220 A * 2/1995 van den Hamer et al. ....... 716/2
5,980,096 A 11/1999 Thalhammer-Reyero
6,587,995 B1 7/2003 Duboc et al.
2006/0106657 A1* 5/2006 Pollak et al. .................. 705/7

FOREIGN PATENT DOCUMENTS

WO WO0122383 A2 3/2001

OTHER PUBLICATIONS

Cavallero, Dave, et al *Integration technology lets business and IT collaborate to improve business results*, Business Integration Systems, Jun. 2003.
Huang, Paul, et al, *Utilizing Simulation to Evaluate Business Decisions in Sense-and-Respond Systems*, Proceedings of the 2004 Winter Simulation Conference, pp. 1205-1212.

* cited by examiner

*Primary Examiner*—Zoila E. Cabrera
*Assistant Examiner*—Dwin M Craig
(74) *Attorney, Agent, or Firm*—Vincent F. Szaloky, Esq.; Steven M. Greenberg, Esq.; Carey Rodriguez Greenberg & Paul LLP

(57) ABSTRACT

Embodiments of the present invention address deficiencies of the art with respect to event driven simulation and provide a method, data processing system and computer program product for mapping a process model for use in a generic simulation engine. In an embodiment of the invention, a generic model simulation method can include mapping a specifically formatted process representation into a generic process model, and providing the generic process model to a simulation engine. The method further can include executing a simulation on the generic process model in lieu of executing the simulation on the specifically formatted process representation.

2 Claims, 2 Drawing Sheets

MODEL INDEPENDENT SIMULATION

The present invention relates to the field of process simulation and more particularly to adapting a specifically formatted process model for use in a generic simulation engine.

DESCRIPTION OF THE RELATED ART

Process modeling and simulation relates to the modeling and simulation of dynamic or static systems, which can include, but are not limited to, enterprise management systems, engineering systems, networked information technology systems, utility systems, utility computing systems, autonomic computing systems, on-demand systems, electric power grids, biological systems, medical systems, weather systems, financial market systems, and business process systems. Such systems can be modeled and simulated for a variety of purposes including monitoring, analysis, control, design, simulation, and management.

A model is an abstract description of a process such as a business process or any other process related to the lifecycle of a system. The abstract description of the model can include sufficient detail required by a simulation engine for exercising the process model with one or more scenarios to determine a likely outcome. Models generally specify one or more tasks or activities of a process and the relationship between the different tasks or activities. As part of the model, one or more events or conditions leading to the transition from one task or activity to the next can be specified. Models generally are expressed according to a specific format. Exemplary formats include Activity Decision Flow (ADF), Business Object Model (BOM), and the Business Process Execution Language (BPEL), to name only a few.

Simulation engines configured to simulate processes defined by a model having a particular format or representation can range from the simple to the complex. Mostly, the complexity of a simulation engine can arise from the complexity of the model tied to the engine implementation and the types of scenarios utilized when exercising a model. Consequently, simulation engines often can interoperate only with a single representation or format of a model. To account for the close coupling of the model representation to the simulation engine, simulation-oriented programming languages have evolved to provide flexibility in accommodating different model representations.

Notwithstanding, coding different simulation logic for each process model representation on an ad hoc basis can be time consuming and can require the expertise of a software development professional. These sorts of inefficiencies can detract from cost benefit provided through the use of simulation. Moreover, as model representations often can be produced by one team and simulated by another, to couple both through a unique simulation coding may not be reasonable in view of the division of labor for modeling and simulation.

BRIEF SUMMARY OF THE INVENTION

Embodiments of the present invention address deficiencies of the art with respect to event driven simulation and provide a novel and non-obvious method, system and computer program product for mapping a process model for use in a generic simulation engine. In a first embodiment of the invention, a generic model simulation method can include mapping a specifically formatted process representation into a generic process model, and providing the generic process model to a simulation engine. The method further can include executing a simulation on the generic process model in lieu of executing the simulation on the specifically formatted process representation.

In one aspect of the embodiment, mapping a specifically formatted process representation into a generic process model can include generating a directed acyclic graph representation of the specifically formatted process representation. For example, generating the directed acyclic graph representation can include mapping each element of the specifically formatted process representation into a node in the directed acyclic graph, and defining directed connections between individual nodes in the directed acyclic graph. Moreover, mapping each element can include mapping known attributes of the specifically formatted process to pre-defined attributes for selected nodes of the generic process model, and mapping other attributes to user-defined attributes which can be referenced by either expressions to be evaluated at a designated point in a simulation of the generic process model, or call-out handlers to be executed at a designated point in a simulation of the generic process model.

In another embodiment of the invention, a generic model simulation data processing system can include a simulation engine configured to simulate a process represented by a generic process model, and a mapper coupled to the simulation engine and enabled to produce the generic process model from a specific representation of the process. In one aspect of the embodiment, the generic process model can include one or more graph elements arranged into the nodes of a directed acyclic graph. To that end, the data processing system also can include a component factory configured to produce the graph elements for the mapper when mapping elements of the specific representation of the process into the nodes of the directed acyclic graph.

Notably, the nodes can include pre-defined attributes for the elements of the specific representation of the process. Also, the nodes can include user-defined attributes for the element of the specific representation of the process. In the latter circumstance, the user-defined attributes are handled by either an expression or a call-out handler. To accommodate the specification of an expression, the data processing system also can include an expression evaluator plug-in coupled to the simulation engine and configured to evaluate expressions which in turn can reference the user-defined attributes. Optionally, the data processing system yet further can include each of a logger, report generator and dumper coupled to the simulation engine. Finally, the data processing system can include an updater coupled to the simulation engine and configured to handle event notifications from the simulation of the generic process model.

An additional embodiment of the invention relates to a computer program product comprising a computer usable medium having computer usable program code for generic model simulation, the computer program product including: computer usable program code for mapping a specifically formatted process representation into a generic process model; and, computer usable program code for providing the generic process model to a simulation engine.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for a model independent simulation engine. In accordance with an embodiment of the present invention, a model independent simulation engine can abstract the specific representation of a process in a specific format into a generic format. The generic format can include a directed acyclic graph having both nodes and directed connections. The nodes and connections of the directed acyclic graph can be associated with user-defined attributes describing features of the process not intrinsically understood by the simulation engine. Optionally, the model independent simulation engine can be pre-configured to directly understand selected attributes such as cost of processing, probability of failure, routing probabilities and the like.

To simulate the process defined by a specific representation, a translator can map the specific representation into a generic representation referred to as a generic process model. Attributes of the former which map directly to the latter in a pre-configuration of the model independent simulation engine can be mapped accordingly. Other attributes can be decomposed by the translator into an equivalent set of model independent simulation engine intrinsic attributes or user defined attributes and mapped accordingly. The model independent simulation engine subsequently can perform the simulation on the generic process model using event-based scheduling.

Figure 1:
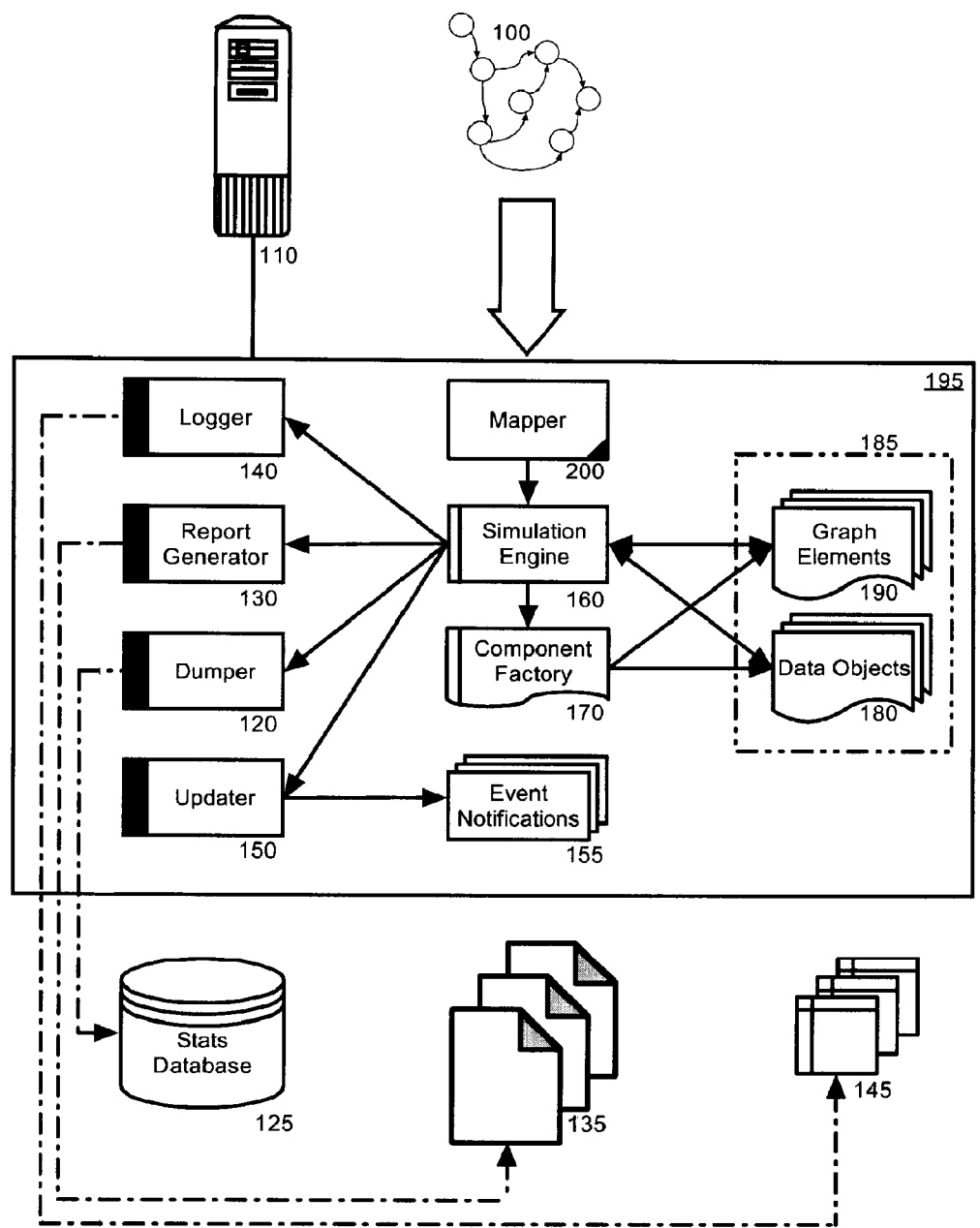
FIG. 1 is a schematic illustration of a modeling and simulation data processing system configured for model independent simulation; and, FIG. 2 is a flow chart illustrating a process for mapping a specific representation of a process model to a generic representation of a process model for use in model independent simulation.

In further illustration of an embodiment of the invention, FIG. 1 is a schematic illustration of a modeling and simulation data processing system configured for model independent simulation. As shown in FIG. 1, the data processing system 195 can be hosted within a computing platform 110 and can include a mapper 200 and a simulation engine 160. The mapper 200 can include program code enabled to transform a specific representation of a model 100 into a generic process model 185 formed from a set of graph elements 190 and data objects 180 arranged in a directed, acyclic graph. The simulation engine 160, in turn, can include program code enabled to simulate the process represented by the generic process model 185.

The program code of the mapper 200 can parse a specific representation 100 of a process, such as an ADF, BOM or BPEL representation of a process. When parsing the specific representation 100, the mapper 200 can create corresponding graph elements 190 and data objects 180 which graph elements 190 and data objects 180 can be arranged to form the generic process model 185 according to mapping rules disposed in the mapper 200. For example, the mapping rules can be pre-configured as part of the mapper 200, or the mapping rules can be defined visually or textually by correlating the elements of the specific representation 100 with the graph elements 190 of the generic process model 185. Specifically, different elements of the specific representation 100 can be mapped to corresponding elements of the generic process model 185 according to either a manual association, or a rules-based association. The resulting generic process model 185 can be provided to the simulation engine 160 for simulation.

Notably, the graph elements 190 can include, for example, tasks represented as nodes in the directed graph, and connections between the nodes. The connections can be unidirectional such that two nodes which can exchange messages between each other can include two separate connections. Each connection can have an opposite direction from the connection of the other node. The data objects, in turn, can be pre-configured storage units for specific data types such as a monetary amount or a time interval. Also, to enforce the componentization architecture of the data processing system 195, a component factory 170 can be coupled to the mapper 120 and used by the mapper 120 to create the graph elements 190 and data objects 180 on demand when mapping the elements of the specific representation 100 to graph elements 190 and data objects 180 of the generic process model 185.

In addition to the mapper 200 and the simulation engine 160, the data processing system 195 further can include each of a dumper 120, a report generator 130, a logger 140, and an updater 150. Each can be coupled to the simulation engine 160. The dumper 120 can include program code enabled to save statistics in a statistics database 125 which can be collected in a simulation of a specified process. Conversely, the dumper 120 can load existing statistics from the statistics database 125 for use in a simulation for the same specified process. The report generator 130 can generate reports 135 relating to the simulation of a specified process by the simulation engine 160.

The logger 140, by comparison, can log messages 145 produced by the simulation engine 160. In this regard, the messages 145, can be error messages or simulation messages. Finally, the updater 150 can receive and process event notifications 155 produced during the simulation of a specified process by the simulation engine 160. It will be apparent to the skilled artisan, that the componentization of the statistics dumping, simulation reporting, simulation engine logging and updating functions can provide for the modularization and replacement of the program code for the dumper 120, report generator 130, logger 140 and updater 150 without requiring wholesale code modifications to the simulation engine—so long as the interface to each remains the same.

The generic nature of the generic process model 185 can arise from the combination of protocol entities and user-defined attributes. The protocol entities can include both nodes and ports for the nodes in the directed acyclic graph. The nodes and corresponding ports can be pre-configured to map to a number of well-known process attributes, such as costs, times and schedules, failure rates, path probabilities, resource requirements and definitions, trigger criteria and the like. The user defined attributes, by comparison, can have names and values provided by the mapper 200, but can enjoy no pre-defined semantics. Instead, the mapper 200 can provide either an expression or a call-out object used to interpret an associated attribute at run-time.

To facilitate the run-time evaluation of a user defined attribute, the simulation engine 160 can be configured to process generic expressions having no pre-defined syntax, semantic or representation. The names associated with the expressions, however, can map to a point during a simulation when the expression is to be evaluated. An expression evaluator plug-in (not shown) can receive the generic expression for evaluation along with an expression identifier and a context. The evaluator plug-in in turn can bind the expression to the context and can evaluate the expression thereby returning a value or updating the state of the simulation engine 160. As an alternative to the evaluator plug-in, a call-out handler which can process the generic expression into a pre-configured internal expression.

Figure 2:
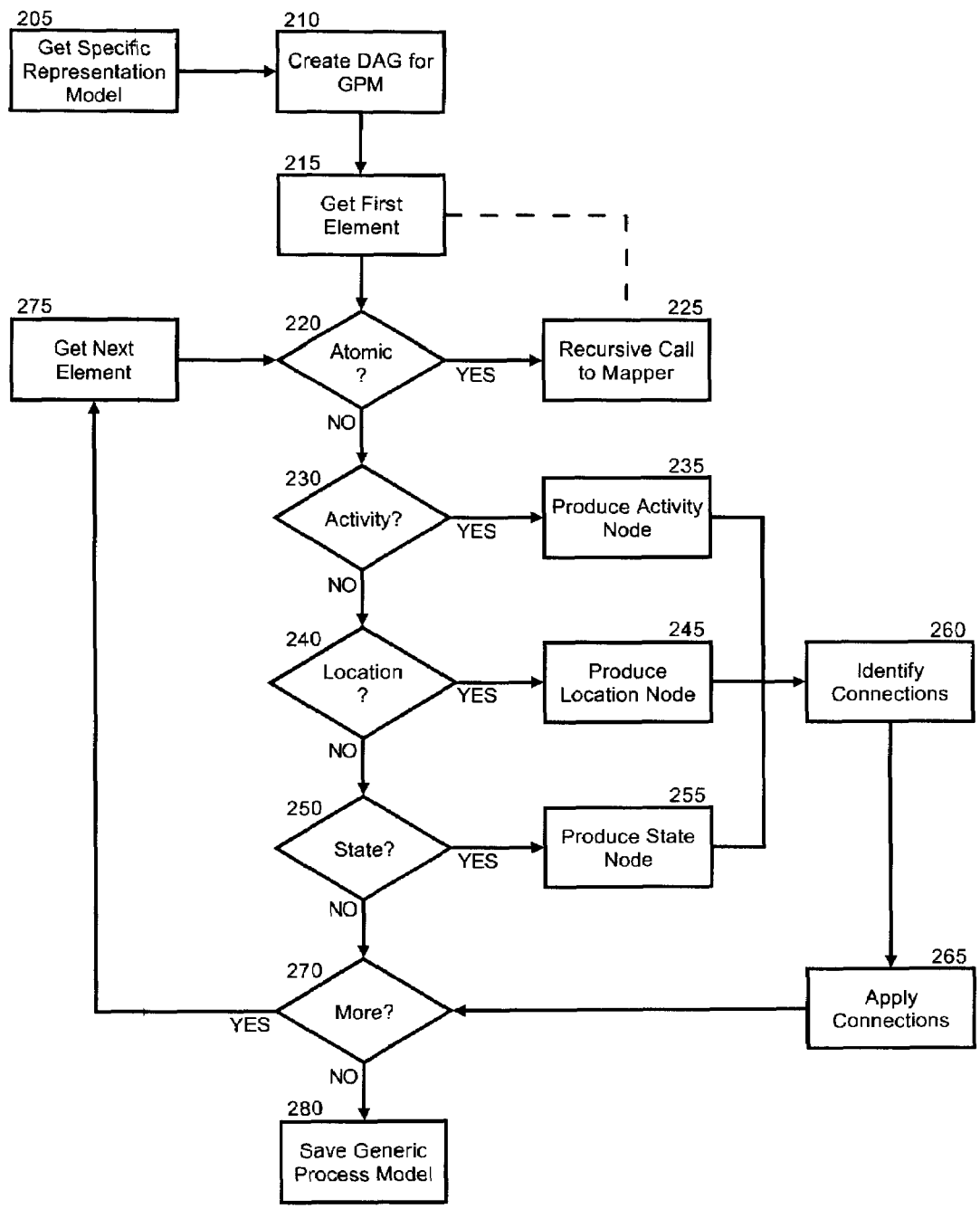

Turning now to FIG. 2, a flow chart is shown which illustrates a process for mapping a specific representation of a process model to a generic representation of a process model for use in model independent simulation. Beginning in block 205, a specific representation of a model can be received for processing and in block 210, a directed acyclic graph for a generic process can be established. In block 215, a first element in the specific representation can be retrieved. In decision block 220, it can be determined whether the element is an atomic element, or whether the element is a process element referencing a hierarchy of elements. In the latter circumstance, in block 225 the process of FIG. 2 can be performed on the hierarchy. Otherwise, the process can continue in decision block 230.

In decision block 230, it can be determined whether the element is a process activity. If so, in block 235 a corresponding activity node can be created and positioned within the directed acyclic graph of the generic process model. Otherwise, in decision block 240, it can be determined whether the element is a process location. If so, in block 245 a corresponding location node can be created and positioned within the directed acyclic graph of the generic process model. Likewise, in decision block 250, it can be determined whether the element is a process state. If so, in block 255 a corresponding state node can be created and positioned within the directed acyclic graph of the generic process model. It is to be recognized by the skilled artisan that a process activity, location and state are but three of many possible element types in a specific model representation and many other types can be mapped to corresponding nodes in the generic process model.

Notwithstanding, only three such element types are shown in FIG. 2 for the sake of simplicity of illustration. Irrespective of the type of node produced for an element in the specific model representation, in block 260, directed connections, if any, can be identified for the node and in block 265 the identified directed connections, if any, can be established as between corresponding nodes in the directed acyclic graph of the generic process model. Thereafter, in decision block 270, if additional elements remain to be processed in the specific model representation, in block 275 a next element in the specific model representation can be retrieved and the process can repeat through decision block 220. In decision block 270, when no more elements remain to be processed in the specific model representation, in block 280 the generic process model can be saved to memory.

Optionally, the generic process model can be passed into the simulation engine where the generic process model can be further mapped into an equivalent internal representation for the simulation engine. The purpose of yet further converting the generic process model into an internal representation is one of optimization and is not required. Notwithstanding, it is to be noted that a direct simulation of the generic process model can be inefficient. As the simulation executes, the engine can populate the generic process model with generated statistics such as costs and revenues of a task represented by a node, failures experienced, paths taken, and the like. The simulation engine also can broadcast updates to registered listener processes which can query the simulation engine for additional information through an exposed application programming interface.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A generic model simulation method comprising:

mapping a specifically formatted process representation into a generic process model;

providing said generic process model to a simulation engine;

mapping each element of said specifically formatted process representation into a node in a directed acyclic graph;

defining directed connections between individual nodes in said directed acyclic graph;

mapping known attributes of said specifically formatted process to pre-defined attributes for selected nodes of said generic process model; and, mapping other attributes of said specifically formatted process to user-defined attributes referencing corresponding expressions to be evaluated at a designated point in a simulation of said generic process model.

2. A generic model simulation method comprising:

mapping a specifically formatted process representation into a generic process model;

providing said generic process model to a simulation engine;

mapping each element of said specifically formatted process representation into a node in a directed acyclic graph;

defining directed connections between individual nodes in said directed acyclic graph;

mapping known attributes of said specifically formatted process to pre-defined attributes for selected nodes of said generic process model; and, mapping other attributes of said specifically formatted process to user-defined attributes referencing corresponding call-out handlers to be executed at a designated point in a simulation of said generic process model.

* * * * *